United States Patent [19]
Border et al.

[11] Patent Number: 4,717,521
[45] Date of Patent: Jan. 5, 1988

[54] THERMAL GATE FOR PLASTIC MOLDING APPARATUS AND METHOD OF USING IT

[75] Inventors: John Border, Amherst, N.H.; Russell B. Ford, Brookline, Mass.

[73] Assignee: Intelitec Corporation, Grosse Pointe Farms, Mich.

[21] Appl. No.: 842,614

[22] Filed: Mar. 21, 1986

[51] Int. Cl.⁴ .............................................. B29C 45/28
[52] U.S. Cl. ................................... 264/219; 219/421; 219/523; 249/78; 264/328.15; 425/547; 425/549
[58] Field of Search ............... 425/547, 549; 137/334, 137/13; 219/421, 523; 264/328.15, 219; 249/78

[56] References Cited

U.S. PATENT DOCUMENTS

| | | | |
|---|---|---|---|
| 3,443,059 | 5/1969 | Spencer | 219/421 |
| 3,520,026 | 7/1970 | Stidham et al. | 425/547 |
| 4,273,525 | 6/1981 | Rietan | 219/421 |
| 4,279,588 | 7/1981 | Gellert | 219/523 |
| 4,386,262 | 5/1983 | Gellert | 219/421 |
| 4,492,556 | 1/1985 | Crandall | 219/523 |
| 4,580,037 | 4/1986 | Müller | 425/549 |
| 4,609,341 | 9/1986 | Müller | 425/547 |

*Primary Examiner*—Willard E. Hoag
*Attorney, Agent, or Firm*—Cullen, Sloman, Cantor, Grauer, Scott & Rutherford

[57] ABSTRACT

A thermal gate for turning on or off the flow of molten molding material into a mold cavity comprises a narrow passage formed by an extremely thin-walled tube of iron-nickel alloy surrounded by a thin sleeve of insulation, this sub-assembly being inserted into a water-cooled mold. When the tube is supplied with electric current, it rapidly heats to a temperature above the melting point of the molding material, permitting such material to flow into the mold cavity. The thin insulating sleeve maintains a temperature gradient across its wall thickness to permit the tube to remain at the desired temperature without undue power input. When it is desired to stop flow of material through the passage, the current is shut off, and the low thermal inertia of the tube and sleeve permit the tube to rapidly transfer its heat to the water-cooled mold, thereby freezing the molding material in the passage.

17 Claims, 1 Drawing Figure

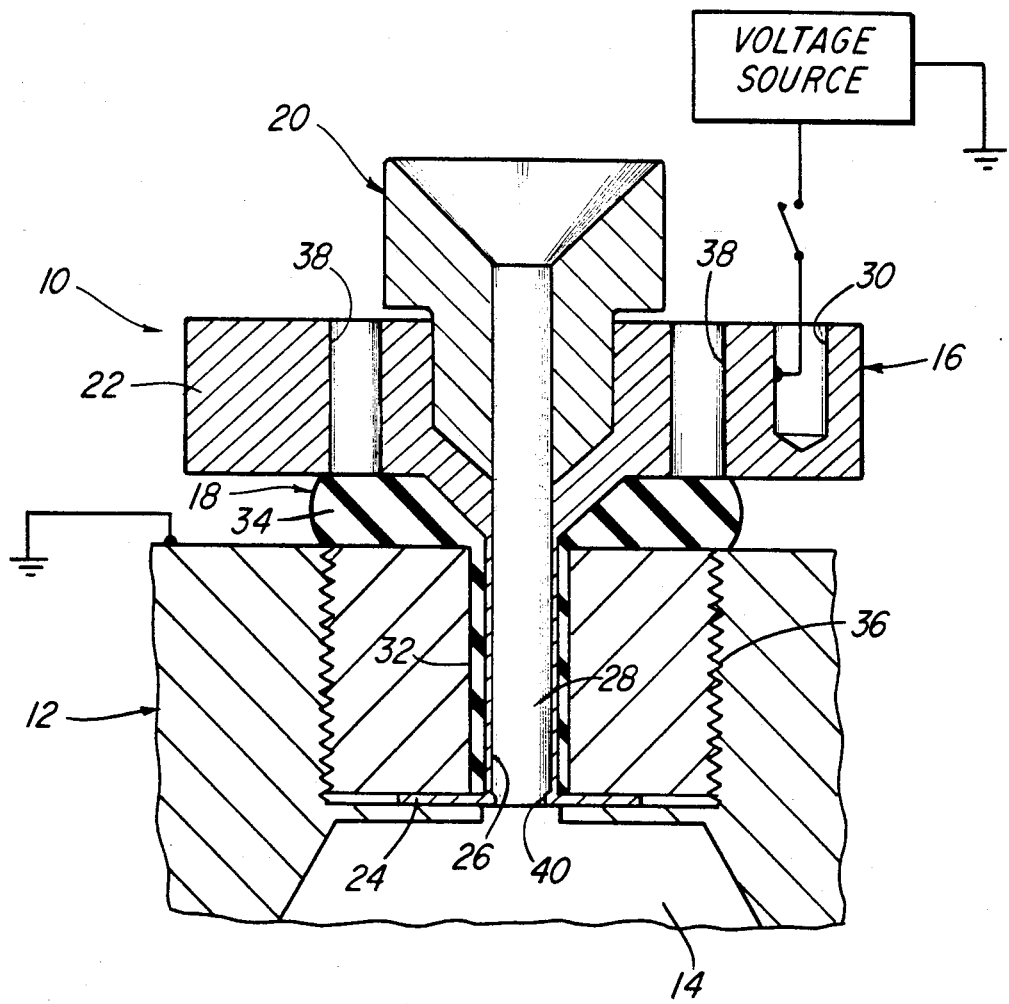

THERMAL GATE FOR PLASTIC MOLDING APPARATUS AND METHOD OF USING IT

BACKGROUND OF THE INVENTION

This invention involves an improved method and apparatus for selectively shutting off the flow of molten plastic molding material to a mold, useful in applications such as injection molding.

In the well-known injection molding process, thermoplastic material is melted to form a viscous liquid which is then injected under pressure into a mold cavity where it cools and solidifies. Solidification is accompanied by volumetric shrinkage, therefore necessitating the maintenance of a high packing pressure during cooling in order to achieve dimensional accuracy of the molded parts. As the plastic in the mold cavity cools, the packing pressure can decline, without any resulting change in dimensions of the molded plastic part.

It is customary to provide some sort of gate or valve to shut off the plastic flow into the cavity once injection is completed and the packing pressure has been induced, in order to prevent plastic in the mold cavity, which is pressurized, from flowing back into the supply runner. Several techniques have been employed to accomplish this shut-off in the constricted or gate area immediately upstream of the mold cavity. One known technique is to cool the gate area so that the plastic in the gate area freezes once flow has essentially stopped due to filling of the cavity, thereby blocking further flow in either direction. This type of cooling system is continuous, providing an essentially constant temperature, so that no precise control of the plastic flow is possible.

Another general type of construction is the use of a movable pin placed in the flow path to close the gate. However, movable pins introduce substantial complexity accompanied by problems such as wear and misalignment of the pin and valve seat, thereby causing maintenance and reliability problems and expenses.

A thermal gate, which is presently being marketed by Spear System, Inc. of Chatsworth, Calif. and described in the U.S. Pat. No. 3,800,027, to Tsutsumi employs a stationary central axial pin in the constricted gate area. The pin has one heating element in its main body and a separately controlled heating element at its tip, the tip being located in the smallest portion of the flow passage. With the tip heater current on, to melt the gate open, plastic flows longitudinally along the length of the pin in the annular zone between the pin and the surrounding walls of the passage. When the tip heater current is turned off, the plastic freezes in the gate area. In the Tsutsumi construction, there are several disadvantages. Some of the flowing plastic passing through the gate area contacts a cooled passage wall, while other portions of the plastic contact the heated wire. The resulting lack of uniform thermal history is often highly undesirable. Secondly, the cooling rate of the Tsutsumi system will be limited by the fact that the wire can only cool by conveying its heat through the plastic to the outer cooled passage walls, because the remainder of the core pin stays hot.

Another patent, somewhat similar to Tsutsumi, is Yoshida, U.S. Pat. No. 4,516,927.

In conventional cooled gates, there is no precise control of the plastic temperature in the gate area. Inaccuracy in the control can result in premature freezing of the plastic in the gate before the mold is filled, commonly known as a "short shot". This problem can be remedied only by using higher pressures or higher temperatures. Higher pressures require the use of larger machines and result in higher residual stresses, whereas higher plastic and mold temperatures result in longer cycle times to cool the part, increasing production costs.

To avoid the waste of plastic in runner systems, which freeze along with the molded part and then have to be removed and recycled, it is common to continuously heat the supply manifold throughout the molding cycle. Plastic flow is constricted in the gate area, and only the very tip of the gate, immediately upstream of the cavity, is cooled. However, it is difficult to accurately confine the cooling area to the constricted gate, while maintaining the supply manifold adjacent thereto in a heated condition. Undesired continued heating in the gate area may cause the molten material in the molded part close to the gate to remain heated longer than the balance of the molded part. Because crystalline and semicrystalline plastic molding materials are very sensitive to their thermal history, this lack of precise temperature control in the gate area may result in undesirable physical properties of the resulting molded part.

While the heated probe type of thermal gate is an improvement over the prior art, the present invention has as its objective the further improvement of thermal gating systems by more accurate temperature control and more rapid heating and cooling in the gate area to further increase the efficiency and reliability of high speed production molding processes.

Laminations of materials possessing differing thermal conductivity properties have therefore been proposed for use in injection molding molds, to improve the physical properties of the molded part. Exemplary of such prior art are the patents to Yotsutsuji et al, U.S. Pat. No. 4,225,109 (thin metal layer lining mold cavity, formed on layer of heat insulating material, to delay cooling of surface of molded part); Yang, U.S. Pat. No. 4,390,485 (thin metal layer of high electrical resistivity lining mold cavity to produce rapid heating thereof). Additionally, co-pending Unites States patent application Ser. No. 616,294 of Holden, Suh and Applicant Border discloses a variety of laminated constructions which are selected for their ability to heat rapidly by electric resistance heating and to cool rapidly upon termination of electrical current flow, with low thermal inertia and minimal thermal stresses. Such laminated constructions are suggested therein for use in controlling the thermal response of the surface of a mold cavity. However, none of these disclosures is concerned with or suggests the use of such constructions as part of a method or apparatus for starting or stopping the flow of molten molding material into the mold cavity, thus acting as a gate or valve.

SUMMARY OF THE INVENTION

The invention involves an improved method and apparatus for starting and stopping the flow of molten molding material into a cavity, as in an injection molding process, whereby the heating and cooling of the walls of a constricted supply passage melts or freezes the molding material passing therethrough, to thereby act as a thermal gate with no moving parts. Freezing of the plastic in the gate area creates a positive shut-off, the timing of which is controlled directly so that premature freezing and short shots are eliminated. Only the walls of the gate are heated, so that hot spots in the mold cavity in the gate area are avoided.

The constricted passage is located immediately upstream from the mold cavity, and comprises an extremely thin-walled elongated tube formed of an electrically conductive material which functions as an electrical resistive heater. The tube is surrounded by a thin-walled sleeve of electrically and thermally insulating material, and this assembly is in intimate contact with the surrounding water-cooled body of the mold. The insulating layer is sufficient to permit the thin-walled tube to maintain a temperature above the melting point of the molding material when electrical current flows along such tube, without the need for excessive power input. However, when the current is interrupted in order to close the gate or "valve" by freezing the molding material therein, the temperature of the tube walls drops rapidly, because of its low thermal inertia resulting from its fabrication from a low density, low specific heat and low thermal conductivity material and the fact that it is very thin.

The passage-defining tube is preferably formed of a nickel-iron alloy such as Invar which has an extremely low coefficient of thermal expansion. The insulating sleeve is preferably formed by winding a fine fiber such as Kevlar, which also has a low thermal expansion, interspersing such windings with brushed-on coatings of a polyimide plastic. Both the Kevlar fiber and the polyimide have very low thermal inertias and are capable of cooling very quickly.

A significant advantage of the present construction is the extremely rapid heating and cooling cycle time provided by the unique combination of dimensions and materials. With the application of a 30 ampere, 0.5 volt input, the walls of the thermal gate valve rise from room temperature to 400° F. in approximately three seconds, and the cool-down response time after interruption of such power is similar. The selection of materials, dimensional proportions and geometry enables this rapid temperature cycling to be achieved with minimal thermal stresses.

BRIEF DESCRIPTION OF THE DRAWINGS

The FIGURE is a greatly enlarged fragmentary cross-sectional view of a portion of an injection mold to which the thermal gate of the present invention has been applied.

DETAILED DESCRIPTION OF THE INVENTION

Referring to the FIGURE, the thermal gate assembly 10 of the present invention is shown installed in a conventional mold 12 having a cavity 14, here shown fragmentarily. It is contemplated that the body of the mold would be provided with passageways for the circulation of cooling water in order to maintain the mold at a relatively constant temperature, as is conventional in injection molding processes.

The thermal gate assembly 10 comprises a passage-defining gate liner 16 and an insulator 18. Nozzle adapter 20 is configured to interface with the output of a conventional injection unit which performs the function of melting, compressing and supplying the pressurized molten molding material.

Referring now to gate liner 16 in further detail, the physical properties of the material from which this part is formed are extremely important for the successful operation of the thermal gate. The liner must function as an electrical resistive heater when current is supplied. Because the body of mold 12 and gate block 36 are maintained at constant temperature by circulating cooling fluid, whereas the gate liner rapidly cycles through a several hundred degree temperature change with each injection cycle, there is a large temperature gradient developed from the liner to the gate block, and there is a potential for severe thermal stresses in the liner and insulating sleeve. The stresses must be minimized to prevent buckling and delamination which would result in loss of the vital surface-to-surface contact required to rapidly conduct heat away from the gate liner when the electrical current is shut off.

One material which admirably supplies the necessary physical properties for gate liner 16 is Invar, an iron-nickel alloy, having a nickel content of about 36 percent, its coefficient of thermal expansion of 0.0000016 in./in./°C. is less than 1/10 that of mild steel, providing a dimensional stability over the required temperature ranges which substantially reduces resulting thermal stresses. The electrical resistance of this alloy is well-suited for the application, permitting rapid heating without excessive current density.

Gate liner 16 comprises a generally spool-shaped cylinder having a large upper flange 22, a small lower flange 24 and a thin-walled throat portion 26 which defines the passage or bore 28 which functions as the gate to mold cavity 14.

It is important that gate liner throat 26 have low thermal inertia so that it is capable of rapid heating and cooling. To this end, it should have low volume or mass and high surface area. Such configuration permits the liner, upon termination of the electrical current flow, to rapidly decrease in temperature along with the molten plastic as heat is conducted away to the gate block 36 through the thin insulator 18. The fact that the upper portion of throat 26 communicates with upper flange 22 (which is constantly hot due to contact with hot nozzle adapter 20), while the lower portion communicates with continuously cooled lower flange 24, does not interfere with the ability of throat 26 to have the desired rapid temperature response. The reason is that the cross-sectional area of the wall of the throat 26 is so small that there is essentially no heat conducting flow path in the longitudinal direction. A length-to-diameter ratio of at least 3 or 4 to 1 for throat 26 also promotes the desired ability to rapidly influence the temperature of the plastic flowing therethrough.

By way of example, a prototype gate liner has been fabricated of Invar, wherein the length of throat portion 26 is one-half inch and the wall thickness is approximately 0.005 inches. The internal diameter of the throat is 0.150 inches.

The properties and dimensions of insulator 18 are also highly significant to the successful operation of the thermal gate. Like the gate liner, the insulator must also have a low coefficient of thermal expansion, to assure dimensional compatibility with the liner as these materials undergo their substantial temperature fluctuations. It must also have a low thermal inertia, to be capable of a rapid temperature response. Low thermal inertia is provided by selection of a material or composite material of low density, low specific heat and low thermal conductivity. Ideally, the temperature response will be maximized if the product of such material's density, specific heat and thermal conductivity is minimized. The binder should also have a low thermal conductivity, to provide heat insulative properties necessary to establish the high thermal gradient across its wall during plastic flow through passage 28. Finally, the insulator must be electrically non-conductive, to assure that the electrical current applied to liner 16 flows through the full length of throat portion 26.

Insulator 18 includes a sleeve portion 32 which concentrically surrounds gate liner throat 26, and a relatively thick upper flange 34 which functions to thermally insulate the continuously hot upper flange 22 of the gate liner from the continuously cooled mold 12 and gate block 36. In the prototype thermal gate which has been constructed by Applicants, sleeve portion 32 has been formed of a composite of Kevlar fiber and polyimide thermosetting resin as the matrix or binder. Flange 34 of insulator 18 has been formed of quartz fiber along with the polyimide matrix.

Kevlar is DuPont's trademark for an aramide fiber which has all of the desired physical properties, including a negative coefficient of thermal expansion. A preferred thickness for the Kevlar layer is approximately 0.025 inches, so that the layer is capable of rapid cooldown while still providing some insulation when the liner 16 is heated. The polyimide matrix material has the desired low density, low specific heat, low thermal conductivity and temperature stability. When the sleeve portion 32 is formed in the manner to be described below, the resulting composite of the Kevlar windings and polyimide matrix will have a coefficient of thermal expansion which is very close to zero.

To form insulator 18, the Kevlar fiber is continuously wound onto throat portion 26 of gate liner 16, the polyimide resin being periodically brushed onto the fiber windings to produce a completed composite which is about 20 percent matrix and 80 percent fiber by volume. In the prototype which has been fabricated by Applicants, the throat portion is thus formed into a wall thickness of approximately 0.035 inches. Following oven curing, sleeve portion 32 is then sanded down to a wall thickness of approximately 0.025 inches. At this point, flange 34 of insulator 18 has not as yet been formed. If desired, a thermocouple may be inserted beneath the Kevlar windings during this fabrication process, to sense the temperature of liner throat 26 during operation. The thermocouple lead may then exit the assembly through the gap between gate block 36 and flange 22.

The subassembly of gate liner 16 and partially formed insulator 18 is then assembled to gate block 36. The gate block is formed of copper, for maximum thermal conductivity, and is initially in two opposed semi-circular halves with a central bore to receive the liner-insulator subassembly which is secured therin with a polyimide or epoxy adhesive. Following this assembly, the next step is the formation of flange portion 34 of the insulator. This step is accomplished by winding into the gap existing between gate block 36 and upper flange 22 of the gate liner a continuous quartz fiber similarly combined with the brushed-on polyimide matrix. Quartz is selected, rather than Kevlar, for the flange portion of the insulator because of its stability at high temperatures and low thermal expansion.

The completed assembly is now ready for insertion into mold body 12. The threaded socket provides substantial surface area for contact with gate block 36 and intimate contact for heat conductivity to assure that the outer surface of insulator sleeve 32 remains very close to the water-cooled temperature of the mold body at all times. Sockets 38 are provided in upper flange 22 to receive a spanner wrench to facilitate the threaded assembly. As soon as it is sensed that the assembly has bottomed out by contact of the lower flange 24 with the bottom of the mold body socket, no further advance or tightening should be attempted, to avoid torsional failure of thin-walled gate liner throat 26.

Electrical current to heat Invar gate liner 16 is provided by a circuit (shown schematically) which is connected to contact socket hole 30 in upper flange 32. The electrical connection may be made by soldering a wire into such socket or by securing the wire therein by a laterally arranged set screw (not shown). The electrical circuit is then completed through the length of the gate liner throat and then from gate liner lower flange 24 directly to the grounded mold body 12 or from such flange to the mold body by way of copper gate block 36. This latter flow path can be enhanced by the use of an electrically conductive polyimide adhesive between the upper face of lower flange 24 and gate block 36.

As can be seen from the FIGURE, there is an internal shoulder 40 at the lower outlet of gate liner bore 28. This restriction forms a zone of reduced diameter in the frozen plug of molding material located immediately adjacent to the formed part in cavity 14. After injection, the cooled and cured part is, as is conventional, ejected from the cavity by pins which force the part downwardly as viewed in the FIGURE. This downward movement places the frozen plug in tension and it fails and separates from the molded part at the point of minimum cross-sectional area and maximum stress created adjacent to shoulder 40.

An exemplary application of the present invention is for injection molding of PET plastic at about 490° F. The mold body is water-cooled to about 40°–50° F., and the gate is "opened" by heating the liner throat 26 to 490° F. The PET plastic freezes to "close" the gate when the plastic in the throat has cooled to about 200° F. following termination of electrical current flow through the gate liner.

An alternative construction which can be operated at a higher voltage and lower current can be formed by winding either a carbon fiber heating element impregnated with a resin or a zirconium wire onto a wear resistant tube. Carbon fiber has a negative coefficient of thermal expansion, so that it will have nearly a zero expansion coefficient when combined with a resin. Zirconium also has a very low expansion coefficient. Invar or silica glass can be used as the wear resistant tube.

Further enhancement of the temperature capability may be achieved by the use of inorganic materials, such as ultra-low thermal expansion glass fibers in place of Kevlar, and a castable ceramic or glass in place of the polyimide resin.

This concept of interrupted controlled cooling may be used to control the flow of any material which undergoes a phase change from liquid or gas to solid.

This invention may be further developed within the scope of the following claims. Accordingly, the above specification is to be interpreted as illustrative of a single operative embodiment of the present invention, rather than in a strictly limited sense.

We now claim:

1. In a molding process wherein molten molding material is supplied under pressure to a mold having a cavity defining the shape of a part to be molded, the improved method for controlling flow of molding material into the cavity which comprises:

directing the molten molding material through a thin-walled elongated tube which defines a restricted flow passage located in the mold immediately upstream of the cavity, said tube being formed of an electrically conductive material which functions as an electrical resistance heater when electric current is applied thereto;

applying electrical current to one end of said tube and passing said current through substantially the entire length of said tube to electrically heat the walls thereof to an elevated temperature above the melting point of the molding material to permit said material to flow through said passage and into the cavity when said current is applied;

thermally insulating the exterior of said tube with a thin-walled sleeve formed of an electrically non-conductive material selected so that the product of its density, specific heat and thermal conductivity is minimized, and said sleeve being dimensioned to be in intimate contact with the exterior of said tube, so that the temperature of the passage walls can be efficiently maintained at said elevated temperature notwithstanding the much lower temperature of the surrounding mold;

forming both said tube and said sleeve of materials such that the coefficients of thermal expansion of said tube and said sleeve are each less than about 0.000004 in./in./°C.;

cooling the surface of said insulating sleeve which is remote from said tube to a temperature which is substantially below said melting temperature of the molding material;

causing the flow of said molding material through said passage to be stopped at a predetermined time by terminating said electrical current, the relatively low mass and high surface area of said tube enabling it to rapidly cool to a temperature which freezes the molding material in said passage;

whereby the initiation and termination of flow of molding material into the cavity may be precisely controlled by the ability of said tube to rapidly melt or freeze the molding material therein in response to the presence or absence of electrical current flow through said tube, and the dimensional compatibility of said tube and said liner is maintained throughout the temperature range of the melting and freezing cycle.

2. The method of claim 1 wherein said tube is formed of a nickel-iron alloy having a coefficient of thermal expansion which is about 0.000002 in./in./°C., and wherein said insulating sleeve is formed by winding the exterior of said tube with a very fine fiber interspersed with a binder material.

3. The improved gate for controlling the flow of molten molding material into a mold cavity which defines the shape of the part to be molded comprising:

a nozzle member connected to a voltage source and having an elongated tube which defines a restricted flow passage located in the mold body immediately upstream of the cavity, said tube having extremely thin walls in said passage area so that it has a high exterior surface area to mass ratio, said tube being formed of an electrically conductive material which functions as an electrical resistive heater when electric current is applied thereto, and has a coefficient of thermal expansion which is less than about 0.000004/in./in./°C., said tube being connected to a ground such that electric current flowing from said voltage source passes substantially through the entire length of said tube;

a thin-walled insulating sleeve surrounding and in intimate contact with the outer wall surface of said tube, said insulating sleeve being formed of a material which (1) is electrically non-conductive, (2) has a coefficient of thermal expansion which is less than 0.000004/in./in./°C., and (3) has a very low thermal inertia due to its having low density, low specific heat and low thermal conductivity, the outer surface of said insulating sleeve being adapted to convey heat by conduction to the mold body;

whereby the application of sufficient electrical current to the length of said tube will raise the temperature of said tube walls above that at which the molding material melts, thereby permitting such material to flow through said passage and into the mold cavity, whereas the termination of such electrical current permits said tube to rapidly cool below the melting point of the molding material, to thereby freeze the molding material in said passage and block further flow of molding material therethrough.

4. The gate of claim 3 wherein said tube has a length-to-diameter ratio of at least three-to-one.

5. The gate of claim 3 wherein the wall thickness of said tube is less than about 0.008 inches.

6. The gate of claim 3 wherein said insulating sleeve is formed of a composite of very fine fiber wound about the exterior of said tube and interspersed with a binder material.

7. The gate of claim 6 wherein said insulating sleeve has a wall thickness which is less than about 0.035 inches.

8. The gate of claim 3 wherein said tube is fabricated of a material having a coefficient of thermal expansion which is about 0.000002 in./in./°C. and has a wall thickness between about 0.004 and 0.006 inches, and wherein said insulating sleeve has a wall thickness which is less than about 0.035 inches.

9. The gate of claim 3 wherein said insulating sleeve is surrounded by an annular collar formed of a material having a high thermal conductivity and adapted to readily conduct heat away from the outer surface of said insulating sleeve and further adapted to be inserted into a mold body in intimate surface-to-surface contact therewith to provide maximum heat transfer from said tube and insulating sleeve to the mold body, said annular collar forming a sub-assembly which can be readily installed and removed from mold bodies.

10. A process for controlling the flow of a material which is in a non-solid form above a predetermined temperature and which freezes to a solid form below such temperature, comprising:

directing such material flow through a thin-walled elongated tube which defines a restricted flow passage, said tube being formed of an electrically conductive material which functions as an electrical resistance heater when electric current is applied thereto;

applying electrical current to said tube and passing said current through substantially the entire length of said tube to heat the walls thereof to an elevated temperature above the predetermined temperature to permit the material to flow therethrough when said curren is applied;

thermally insulating the exterior of said tube with a thin insulating sleeve formed of an electrically non-conductive material selected so that the product of its density, specific heat and thermal conductivity is minimized, and said sleeve being dimensioned to be in intimate contact with the exterior of said tube, so that the temperature of the passage walls can be efficiently maintained at said elevated temperature;

forming both said tube and said sleeve of materials such that the coefficience of thermal expansion of said tube and said sleeve are each less than about 0.000004 in./in./°C.;

cooling the surface of said insulating sleeve which is remote from said tube to a temperature which is substantially below said predetermined temperature; and causing the flow of such material through said passage to be stopped by terminating said electrical current, the relatively low mass and high surface area of said tube and the low thermal inertia of said insulating sleeve enabling said tube to rapidly cool to a temperature which freezes the material in said passage;

whereby the initiation and termination of flow of molding material into the cavity may be precisely controlled by the ability of said tube to rapidly melt or freeze the molding material therein response to the presence or absence of electrical current flow through said tube, and the dimensional compatibility of said tube in said liner is maintained throughout the temperature range of the melting and freezing cycle.

11. A thermo-electrically controlled valve means for controlling the flow of molten molding material into a mold cavity which defines the shape of the part to be molded, said valve means comprising:

a nozzle member connected to a voltage source, said nozzle being defined by a sprue for the introduction of molten molding material and an elongated thin-walled tube that defines a restricted flow passage located in the mold immediately upstream of the cavity, said tube being formed of an electrically conductive material and being grounded such that electric current from said voltage source passes through substantially the entire length of said tube to form an electrical resistance heater;

insulating means in the form of a thin-walled sleeve surrounding and intimately contacting the outer wall of said tube and insulating the nozzle electrically and thermally from surrounding portions of the mold except for the grounded connection of said tube, said insulating means having a very low thermal inertia due to its having low density, low specific heat and low thermal conductivity, the outer surface of said insulating sleeve being adapted to convey heat by conduction to the mold body;

both said tube and said sleeve being formed of materials such that the coefficients of thermal expansion of said tube and said sleeve are each less than about 0.00004 in./in./°C.;

whereby the application of sufficient electrical current to the length of said tube will raise the temperature of said tube walls above that at which the molding material melts, thereby permitting such material to flow through said passage and into the mold cavity, whereas the termination of such electrical current permits said tube to rapidly cool below the melting point of the molding material, to thereby freeze the molding material in said passage and block further flow of molding material therethrough.

12. The thermo-electrically controlled valve of claim 11 wherein said tube has a length-to-diameter ratio of at least three-to-one.

13. The thermo-electrically controlled valve of claim 11 wherein the wall thickness of said tube is less than about 0.008 inches.

14. The thermo-electrically controlled valve of claim 11 wherein said insulating sleeve is formed of a composite of very fine wound about the exterior of said tube and interspersed with a binder material.

15. The thermo-electrically controlled valve of claim 14 wherein said insulating sleeve has a wall thickness which is less than about 0.035 inches.

16. The thermo-electrically controlled valve of claim 11 wherein said tube is fabricated of a material having a coefficient of thermal expansion which is about 0.000002 in./in./°C. and has a wall thickness between about 0.004 and 0.006 inches, and wherein said insulating sleeve has a wall thickness which is less than about 0.035 inches.

17. The thermo-electrically controlled valve of claim 11 wherein said insulating sleeve is surrounded by an annular collar formed of a material having a high thermal conductivity and adapted to readily conduct heat away from the outer surface of said insulating sleeve and further adapted to be inserted into a mold body in intimate surface-to-surface contact therewith to provide maximum heat transfer from said tube and insulating sleeve to the mold body, said annular collar forming a sub-assembly which can be readily installed and removed from mold bodies.

* * * * *

UNITED STATES PATENT AND TRADEMARK OFFICE
CERTIFICATE OF CORRECTION

PATENT NO. : 4,717,521

DATED : January 5, 1988

INVENTOR(S) : John Border and Russell B. Ford

It is certified that error appears in the above-identified patent and that said Letters Patent is hereby corrected as shown below:

At Column 9, Line 25, following "therein", — in — should be inserted.

At Column 10, Line 28, following "fine", — fiber — should be inserted.

Signed and Sealed this

Twelfth Day of July, 1988

Attest:

DONALD J. QUIGG

Attesting Officer

Commissioner of Patents and Trademarks